(12) United States Patent
Hessling-Von Heimendahl et al.

(10) Patent No.: US 10,501,203 B2
(45) Date of Patent: Dec. 10, 2019

(54) COMBINED AIRCRAFT WING SCAN AND RUNWAY TURN-OFF LIGHT UNIT AND AIRCRAFT COMPRISING THE SAME

(71) Applicant: Goodrich Lighting Systems GmbH, Lippstadt (DE)

(72) Inventors: Andre Hessling-Von Heimendahl, Koblenz (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/983,142

(22) Filed: May 18, 2018

(65) Prior Publication Data

US 2018/0334263 A1 Nov. 22, 2018

(30) Foreign Application Priority Data

May 19, 2017 (EP) .................................... 17171921

(51) Int. Cl.
*B64D 47/04* (2006.01)
*F21S 43/20* (2018.01)
*F21S 43/14* (2018.01)
*F21S 41/141* (2018.01)
*B64D 47/06* (2006.01)
*F21S 41/25* (2018.01)

(52) U.S. Cl.
CPC ............. *B64D 47/04* (2013.01); *B64D 47/06* (2013.01); *F21S 41/141* (2018.01); *F21S 41/25* (2018.01); *F21S 43/14* (2018.01); *F21S 43/26* (2018.01)

(58) Field of Classification Search
CPC ....... B64D 47/06; B64D 47/04; F21S 41/141; F21S 41/25; F21S 43/14
See application file for complete search history.

(56) References Cited

U.S. PATENT DOCUMENTS

| 7,055,994 | B2 | 6/2006 | Martin | |
|---|---|---|---|---|
| 8,851,718 | B2 | 10/2014 | Jha et al. | |
| 9,469,415 | B1* | 10/2016 | Harvey | B64D 47/04 |
| 9,635,739 | B2* | 4/2017 | Schoen | B64D 47/04 |
| 2006/0007013 | A1* | 1/2006 | Singer | B64D 47/06 |
| | | | | 340/815.45 |
| 2008/0137353 | A1 | 6/2008 | Larsen | |

(Continued)

FOREIGN PATENT DOCUMENTS

JP 2011246028 A 12/2011

OTHER PUBLICATIONS

Extended European Search Report for International Application No. 17171921.4 dated Nov. 3, 2017, 6 pages.

*Primary Examiner* — Robert J May
*Assistant Examiner* — Leah Simone Macchiarolo
(74) *Attorney, Agent, or Firm* — Cantor Colburn LLP

(57) ABSTRACT

A combined aircraft wing scan and runway turn-off light unit includes a housing for mounting the combined aircraft wing scan and runway turn-off light unit to a side portion of a fuselage of an aircraft; at least one light source; and an optical system for shaping a light emission distribution of the combined aircraft wing scan and runway turn-off light unit; wherein the light emission distribution comprises a first illumination region for illuminating a wing region of the aircraft and a second illumination region for illuminating a lateral forward airfield region.

13 Claims, 3 Drawing Sheets

(56) References Cited

U.S. PATENT DOCUMENTS

| | | | |
|---|---|---|---|
| 2013/0077332 A1* | 3/2013 | Hessling | B64D 47/06 362/470 |
| 2014/0328074 A1* | 11/2014 | Jha | B64D 47/06 362/470 |
| 2016/0046390 A1* | 2/2016 | Von Heimendahl | B64D 47/06 362/470 |
| 2017/0106999 A1* | 4/2017 | Lapujade | B64F 1/002 |
| 2018/0050821 A1* | 2/2018 | Schoen | B64D 47/06 |

* cited by examiner

COMBINED AIRCRAFT WING SCAN AND RUNWAY TURN-OFF LIGHT UNIT AND AIRCRAFT COMPRISING THE SAME

FOREIGN PRIORITY

This application claims priority to European Patent Application No. 17171921.4 filed May 19, 2017, the entire contents of which is incorporated herein by reference.

TECHNICAL FIELD

The present invention is in the field of aircraft lighting. In particular, the present invention is in the field of exterior aircraft light units that support the pilot and/or crew during operation of the aircraft.

BACKGROUND

Almost all aircraft, in particular large commercial air planes, are equipped with numerous exterior lights. Exterior aircraft lights are provided for numerous purposes, ranging from signalling/passive visibility, such as navigation lights or anti-collision lights, over active visibility, such as landing lights and taxi lights, to special purpose lights, such as cargo loading lights. With the different exterior aircraft lights being distributed over various portions of the aircraft, in particular over various portions of a large commercial air plane, an overall highly complex exterior aircraft lighting system is present in modern-day aircraft.

SUMMARY

Accordingly, it would beneficial to provide an exterior aircraft light unit that reduces the complexity of the exterior aircraft lighting system.

Exemplary embodiments of the invention include a combined aircraft wing scan and runway turn-off light unit, comprising a housing for mounting the combined aircraft wing scan and runway turn-off light unit to a side portion of a fuselage of an aircraft; at least one light source; and an optical system for shaping a light emission distribution of the combined aircraft wing scan and runway turn-off light unit; wherein the light emission distribution comprises a first illumination region for illuminating a wing region of the aircraft and a second illumination region for illuminating a lateral forward airfield region.

Exemplary embodiments of the invention allow for reducing the complexity of exterior aircraft lighting systems by combining the functionality of two previously separate light units into a single exterior aircraft light unit. In particular, as compared to previous approaches, where a runway turn-off light unit was mounted to a front running gear of the aircraft and where a wing scan light unit was arranged in a side portion of an aircraft fuselage, two entirely different light units from entirely different positions of the aircraft are combined into a single exterior aircraft light unit.

In this way, wiring efforts for control and power supply may be reduced. Also, the overall weight requirements and space requirements of the exterior aircraft lighting system may be reduced. Yet further, the runway turn-off light unit of previous approaches, which was arranged at the front running gear of the aircraft, may be entirely eliminated, saving space and weight at a very critical location. Further, as such a previous runway turn-off light units were prone to bird strikes and caused significant aerodynamic drag, the maintainance efforts may be lowered and the aerodynamic efficiency of the aircraft may be increased by the combined aircraft wing scan and runway turn-off light unit.

The housing of the aircraft wing scan and runway turn-off light unit is configured to be mounted to a side portion of a fuselage of an aircraft. In particular, the housing may have a shape corresponding to an according recess in the side portion of the fuselage of the aircraft. In this way, the combined aircraft wing scan and runway turn-off light unit may be inserted into the side portion of the fuselage. In particular, the housing may be inserted into the side portion in such a way that an outer portion of the combined aircraft wing scan and runway turn-off light unit is flush with the fuselage of the aircraft. The outer portion of the combined aircraft wing scan and runway turn-off light unit may at least partly be formed by a transparent cover.

The term light emission distribution refers to the combined distribution of the wing scan functionality and the runway turn-off functionality. In other words, the term light emission distribution refers to the light distribution of the combined aircraft wing scan and runway turn-off light unit when all light sources are switched on, irrespective of whether the two functionalities are actually used at the same time or only in different operating situations during operation of the aircraft. In yet other words, the term light emission distribution refers to the total potential light emission by the combined aircraft wing scan and runway turn-off light unit.

The optical system shapes the light emission distribution of the combined aircraft wing scan and runway turn-off light unit. The term optical system refers to the entirety of optical elements, such as lens(es) and reflector(s), that are in the path of the light rays from the one or more light sources to an exit surface of the combined aircraft wing scan and runway turn-off light unit. The optical system may be comprised of a plurality of optical elements, as will be explained below.

During operation of the aircraft, the first illumination region may be used by the pilot and/or crew to inspect the wing for ice build-up. This is particularly useful during flight due to the very low outside temperatures. The wing scan functionality may also be used for inspecting the engine attached to the wing. Also, the illumination of the wing region of the aircraft may be switched on, when on the ground or close to the ground for increased passive visibility.

The second illumination region may be used for inspecting a lateral forward airfield region on an airport during taxiing, in particular shortly after landing, in order to have a good awareness of those portions of the airfield that allow for a save and quick leaving of the runway. The runway turn-off functionality may be used right after landing and/or generally during taxiing of the aircraft.

According to a further embodiment, the first illumination region has a wing illumination reference direction and provides for wing illumination with a horizontal opening angle of between 10° and 30°, in particular of between 15° and 25°, around the wing illumination reference direction. In this way, an effective illumination along the width of the aircraft wing or along a very significant portion of the width of the aircraft wing can be achieved, such that the wing can be checked for ice build-up along its width/along a substantial part of its width. The term horizontal opening angle refers to the opening angle of the first illumination region in the front-to-rear-direction of the aircraft. Via the housing and the particular mounting of the combined aircraft wing scan and runway-turn off light unit to the fuselage of the aircraft, the front-to-rear direction of the aircraft is also clearly defined in the light unit frame of reference.

According to a further embodiment, the wing illumination reference direction has a lateral angle of between 35° and 55°, in particular of between 40° and 50°, more in particular of about 45°, with respect to a rearward longitudinal direction of the aircraft. In this way, the first illumination is generally directed backwards from the side portion of the fuselage and generally towards the front portion of the wing. An effective inspection of the front portion of the wing is thus made possible. The term lateral angle refers to an angle in a horizontal plane through the combined aircraft wing scan and runway turn-off light unit. In particular, the term lateral angle refers to the angle between the reference direction and the axis of longitudinal extension of the aircraft, when projected onto said horizontal plane.

According to further embodiment, the first illumination region provides for wing illumination with a vertical opening angle of between 10° and 50°, in particular of between 20° and 40°, around the illumination reference direction. In this way, the first illumination region may have sufficient height for a good inspection of the aircraft wing. Depending on the application in question, the vertical opening angle may be on the lower side of the mentioned value ranges, focusing the lighting power on the wing front edge, or on the higher side of the mentioned value ranges, distributing the lighting power between the front edge of the wing and the front edge of the engine, generally arranged below the wing.

According to a further embodiment, the second illumination region has an airfield illumination reference direction and provides for airfield illumination with a horizontal opening angle of between 20° and 70°, in particular of between 30° and 60°, more in particular of between 40° and 50°, around the airfield illumination reference direction. In this way, efficient illumination of the airfield in runway turn-off situations may be achieved.

According to a further embodiment, the airfield illumination reference direction has a lateral angle of between 35° and 55°, in particular of between 40° and 50°, more in particular of about 45°, with respect to a forward longitudinal direction of the aircraft. In this way, the second illumination region is generally oriented forward and to the side, achieving good runway turn-off illumination originating from the side portion of the fuselage. In particular, the second illumination region may thus provide for airfield illumination that is in accordance with SAE Aerospace Recommended Practice (ARP) 693 and/or 6402. While these provisions only specify illumination values for particular points on the airfield, the given value ranges for the second illumination region enable reaching these desired illumination points for various aircraft types.

According to a further embodiment, the second illumination region provides for airfield illumination with a vertical opening angle of between 10° and 20°. In this way, good illumination of the airfield along a reasonable length is achieved.

According to a further embodiment, between the first illumination region and the second illumination region, the light intensity distribution has a light intensity of less than 10%, in particular of less than 5%, of a peak light intensity in the second illumination region. In this way, the lighting power of the combined aircraft wing scan and runway turn-off light unit is efficiently split-off between the first illumination region and the second illumination region. The region in between these two illumination regions, where a light output would have no purpose in terms of runway turn-off functionality nor in terms of wing scan functionality, has no illumination or only very little stray illumination, leading to an efficient implementation of the combined aircraft wing scan and runway turn-off light unit.

According to a further embodiment, the first illumination region is different from the second illumination region in at least one of peak light intensity, light intensity distribution, horizontal opening angle, and vertical opening angle.

According to a further embodiment, the second illumination region has a peak light intensity of between 15,000 cd and 25,000 cd.

According to further embodiment, the at least one light source comprises at least one LED. In particular, the at least one light source is at least one LED. Further in particular, all light sources of the combined aircraft wing scan and runway turn-off light unit may be LEDs. In this way, the combined aircraft wing scan and runway turn-off light unit has highly efficient, reliable and small light sources.

According to a further embodiment, the at least one light source and the optical system are stationary within the combined aircraft wing scan and runway turn-off light unit. In other words, the at least one light source and the optical system have a fixed position within the housing of the combined aircraft wing scan and runway turn-off light unit. In yet other words, the at least one light source and the optical system are not mechanically moveable or turnable for reaching different light outputs at different points in time. Rather, the at least one light source and the optical system provide for a set system, with different light outputs only being achievable via the switching on/off of the light sources. In the absence of any moveable or rotatable light sources and optical systems, a highly robust structure of the combined aircraft wing scan and runway turn-off light unit can be achieved. Low maintenance efforts are required for such a robust structure.

According to a further embodiment, the at least one light source comprises a plurality of light sources having at least one first light source and at least one second light source, wherein light from the at least one first light source is directed to the first illumination region and wherein light from the at least one second light source is directed to the second illumination region. In particular, light from each of the at least one first light source and the at least one second light source is directed exclusively to one of the two illumination regions. In this way, the wing scan functionality and the runway turn-off functionality are separated between different light sources. In this way, the light sources can be individually adapted to the respective functionalities, such as with respect to their power ratings and illumination capacities, allowing for an overall well-suited and efficient implementation of the two different lighting functionalities.

According to a further embodiment, the combined aircraft wing scan and runway turn-off light unit further comprises at least one first optical system for directing the light from the at least one first light source to the first illumination region and at least one second optical system for directing the light from the at least one second light source to the second illumination region. In this way, both the light sources and the optical systems may be adapted to the peculiars of both the wing scan functionality and the runway turn-off functionality. The first optical system and the second optical system jointly form the overall optical system of the combined aircraft wing scan and runway turn-off light unit.

According to a further embodiment, the at least first one optical system and/or the at least one second optical system is a reflector. In particular, each optical system may be reflector. It is also possible that the at least one first optical system and/or the at least second optical system is a lens. In particular, each of the at least one first optical system and the at least one second optical system is a lens. It is also possible that the one or more first optical systems and/or the one or more second optical systems comprise a combination of reflectors or lenses. Each optical system may have a combination of reflector(s) and lens(es). It is also possible that each optical system has only reflector(s) or lens(es), with the overall optical system having a combination of reflector(s) and lens(es).

According to a further embodiment, the combined aircraft wing scan and runway turn-off light unit comprises a single power supply, with the at least one first light source and the at least one second light source sharing the single power supply. In this way, the two lighting functionalities are achieved with a single power supply, thus contributing to the low overall weight of the exterior aircraft lighting system.

According to further embodiment, the combined aircraft wing scan and runway turn-off light unit further comprises a switching circuit, with the switching circuit providing power to either the at least one first light source or to the at least one second light source. In this way, a combined aircraft wing scan and runway turn-off light unit is provided that provides only one of the wing scan functionality and the runway turn-off functionality at any given time. By preventing both lighting functionalities to be present at the same time, the power requirement of the combined aircraft wing scan and runway turn-off light unit is kept small, namely kept to the higher one of the power requirements of the two lighting functionalities. In this way, the overall power requirement of the exterior aircraft light unit system can be kept below a comparably low limit value.

According to a further embodiment, the at least one light source is exactly one light source and the combined aircraft wing scan and runway turn-off light unit further comprises an optical system, in particular a lens, for splitting light from the exactly one light source between the first illumination region and the second illumination region. In this way, a low component implementation, having only one light source, may be provided. In this way, a combined aircraft wing scan and runway turn-off light unit with particularly low complexity in terms of switching and light source layout may be achieved.

Exemplary embodiments of the invention further include an aircraft comprising an aircraft fuselage, extending from a nose to a tail of the aircraft; a left wing, having a left wing root, and a right wing, having a right wing root; and at least one combined aircraft wing scan and runway turn-off light unit according to any of the preceding claims; wherein the at least one combined aircraft wing scan and runway turn-off light unit is mounted to at least one of a left side portion and a right side portion of the aircraft fuselage. In particular, the aircraft may have two combined wing scan and runway turn-off light units, with one being mounted to the right side portion of the aircraft fuselage and one being mounted to the left side portion of the aircraft fuselage. The modifications, additional features and effects described above with respect to the combined aircraft wing scan and runway turn-off light unit are applicable to the aircraft in an analagous manner.

According to a further embodiment, the at least one combined aircraft wing scan and runway turn-off light unit is positioned between 30% and 70%, in particular between 40% and 60%, of the distance between the nose of the aircraft and a respective one of the left wing root and the right wing root of the aircraft. In this way, the combined aircraft wing scan and runway turn-off light unit is particularly suitably positioned for an effective illumination of both the aircraft wing towards the rear and the airfield for runway turn-off purposes towards the front.

BRIEF DESCRIPTION OF THE DRAWINGS

Further exemplary embodiments of the invention will be described with respect to the Figures below.

DETAILED DESCRIPTION

Figure 1:
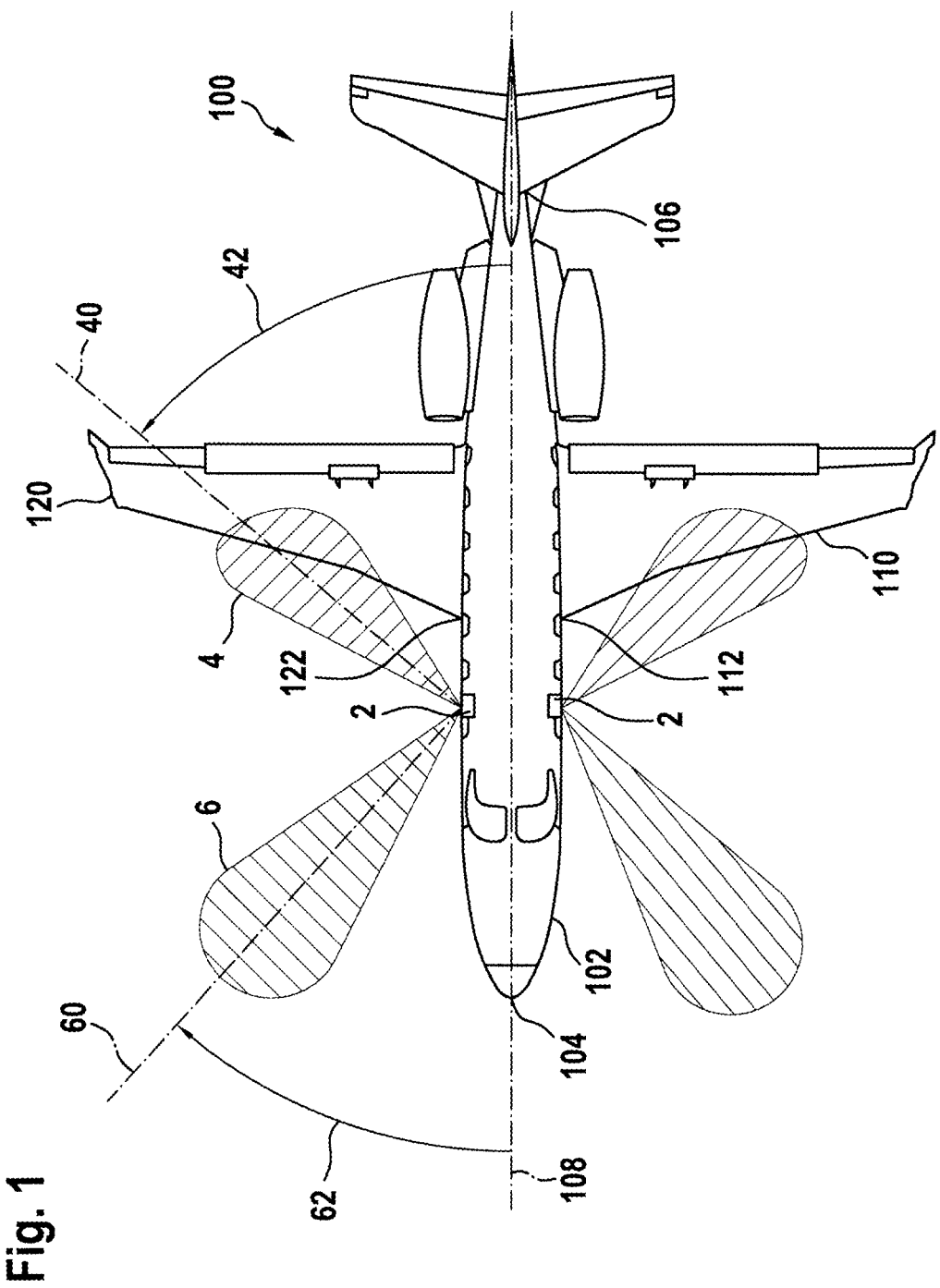
FIG. 1 shows an aircraft in accordance with an exemplary embodiment of the invention, equipped with two combined aircraft wing scan and runway turn-off light units in accordance with an exemplary embodiment of the invention.

FIG. 1 shows an aircraft 100 in accordance with an exemplary embodiment of the invention. The aircraft 100 is equipped with two combined aircraft wing scan and runway turn-off light units 2 in accordance with an exemplary embodiment of the invention.

The aircraft 100 has a fuselage 102, which extends from a nose 104 to a tail 106 of the aircraft 100. Further, the aircraft 100 has left wing 110 that is attached to the fuselage 102 at the left wing root 112. The wing root is defined as the connection between the wing and the fuselage 102. The aircraft 100 further has a right wing 120 that is attached to the fuselage 102 at the right wing root 122. While the aircraft 100 is shown to have engines between the wings and the tail 106, it is apparent to the skilled person that exemplary embodiments of the invention also apply to aircraft having the engines mounted to the underside of the wings. In particular, as it will be explained below, the combined aircraft wing scan and runway turn-off light unit 2 may even have increased functionality in such cases.

The aircraft 100 has a right combined aircraft wing scan and runway turn-off light unit and a left combined aircraft wing scan and runway turn-off light unit, both of which are indicated with reference numeral 2. The left and right combined aircraft wing scan and runway turn-off light units are of equal general design, but are symmetric with respect to each other, in order to provide symmetric illumination with respect to a longitudinal axis 108 of the aircraft 100. In the following, the right combined aircraft wing scan and runway turn-off light unit 2 will be described with respect to its light output. It is apparent to the skilled that analogous considerations apply to the left combined aircraft wing scan and runway turn-off light unit.

The right combined aircraft wing scan and runway turn-off light unit 2 has a first illumination region 4 for illuminating a wing region of the right wing 120 of the aircraft 100. The first illumination region 4 is generally oriented in a wing illumination reference direction 40. The wing illumination reference direction 40 has a lateral angle 42 of about 45° with respect to a rearward longitudinal direction of the aircraft, which coincides with or is parallel to the longitudinal axis 108 of the aircraft 100 in a vertical cross-sectional plane. While this lateral angle 42 is shown in FIG. 1 with respect to the longitudinal axis 108, substantially the same rearward angle is present with respect to an outer surface of the right combined aircraft wing scan and runway turn-off light unit 2. This is because the combined aircraft wing scan and runway turn-off light unit 2 is arranged at a portion of the fuselage 102 where its outer surface is substantially parallel to a vertical cross-sectional plane through the aircraft 100 at the longitudinal axis 108. Accordingly, while being shown with respect to the aircraft 100, the lateral angle 42 of about 45° with respect to a rearward longitudinal direction of the aircraft 100 is also defined in the light unit frame of reference.

The first illumination region 4 is depicted as a lobe, as is common for illustrating light intensities of light units. In particular, the outer shape of the lobe of the first illumination region 4 indicates relative light intensities for the different angles around the wing illumination reference direction 40. It is explicitly pointed out that not only the portion of the right wing 120 where the lobe touches the right wing 120 is illuminated. Rather, the lobe indicates which angular directions of the first illumination region have which relative light intensities. Accordingly, the first illumination region provides for illumination up to the tip of the right wing 120. The horizontal opening angle of the first illumination region 4 around the wing illumination reference direction 40 is about 25° in the exemplary embodiment of FIG. 1.

The combined aircraft wing scan and runway turn-off light unit 2 has a second illumination region 6 for illuminating a lateral forward airfield region. The second illumination region 6 is generally oriented in the airfield illumination reference direction 60. The airfield illumination reference direction 60 has a lateral angle 62 of about 40° with respect to the forward longitudinal direction of the aircraft, which again coincides with or is parallel to the longitudinal axis 108 of the aircraft 100 in a vertical cross-sectional plane. Again, it is emphasised that this lateral angle 62, while being depicted with respect to the longitudinal axis 108 of the aircraft 100, is also defined in the light unit frame of reference for the reasons laid out above. In the exemplary embodiment of FIG. 1, the second illumination region 6 has a horizontal opening angle of about 35° around the airfield illumination reference direction 60.

The combined aircraft wing scan and runway turn-off light unit 2 combines two functionalities. On the one hand, the combined aircraft wing scan and runway turn-off light unit allows for an illumination of at least a major part of a wing of the aircraft, which allows the pilot and/or crew to inspect the wing for ice build-up, in particular during the flight. On the other hand, the combined aircraft wing scan and runway turn-off light unit 2 provides for illumination of the airfield in a lateral forward direction, which provides runway turn-off illumination for the pilot when maneuvering on the airfield, in particular shortly after landing and for turning away from the runway. The functionalities are combined in a single light unit, eliminating the need of previous approaches to have separate light units in separate places for these two functionalities.

Figure 2:
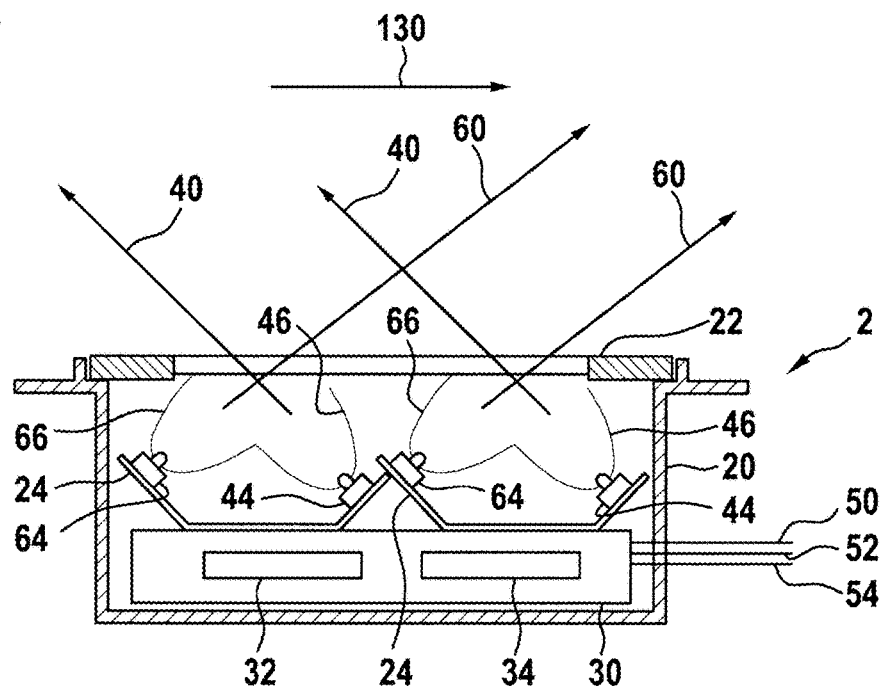
FIG. 2 shows a combined aircraft wing scan and runway turn-off light unit in accordance with an exemplary embodiment of the invention.

FIG. 2 shows a combined aircraft wing scan and runway turn-off light unit 2 in a schematic horizontal cross-sectional view, with some components being shown schematically in block diagram fashion. In the exemplary embodiment of FIG. 2, the combined aircraft wing scan and runway turn-off light unit 2 is configured for being inserted into a left side portion of the fuselage of the aircraft. However, as laid out above, the combined aircraft wing scan and runway turn-off light unit can be used for the right side of the aircraft with an analogous, symmetric design.

The combined aircraft wing scan and runway turn-off light unit 2 has a housing 20 and a cover 22. The housing 20 and the cover 22 define an interior space for the other components of the combined aircraft wing scan and runway turn-off light unit 2. The housing 20 allows for mounting the combined aircraft wing scan and runway turn-off light unit 2 to a side portion of a fuselage of an aircraft. In particular, the housing 20 allows for being inserted into a corresponding recess in the fuselage, which in turn allows for the cover 22 to provide a flush surface with respect to the side portion of the fuselage. The cover 22 closes the housing 20 with respect to the lateral outside of the fuselage. The cover 22 is at least partially transparent. In the exemplary embodiment of FIG. 2, a center portion of the cover 22 is transparent, thus allowing the light of the combined aircraft wing scan and runway turn-off light unit 2 to leave the same.

The combined aircraft wing scan and runway turn-off light unit 2 has two support brackets 24. Each the of two support brackets 24 holds a respective first light source 44, a first reflector 46, a second light source 64, and a second reflector 66. Accordingly, the combined aircraft wing scan and runway turn-off light unit 2 has two first light sources 44, two first reflectors 46, two second light sources 64, and two second reflectors 66. The two first reflectors 46 and the two second reflectors 66 jointly form the optical system of the combined aircraft wing scan and runway turn-off light unit 2.

The two first light sources 44 and the two first reflectors 46 provide for the wing scan functionality of the combined aircraft wing scan and runway turn-off light unit 2. In particular, these components provide for the first illumination region in the light emission distribution of the combined aircraft wing scan and runway turn-off light unit 2. The first illumination region is generally oriented in the wing illumination reference direction 40. The first reflectors 46 have a collimating effect on the light emitted from the first light sources 44. In this way, as compared to the light intensity distribution of the light sources 44, the first illumination region has a more narrow opening angle. For this purpose, the first reflectors 46 may be parabolic or spherical or have any other suitable shape. The first light sources 44 are LEDs in the exemplary embodiment of FIG. 2.

The second light sources 64 and the second reflectors 66 provide for the runway turn-off light functionality of the combined aircraft wing scan and runway turn-off light unit 2. The conditioning of the second illumination region is similar to the conditioning of the first illumination region described above. In particular, the second reflectors 66 have a collimating effect on the light emitted from the second light sources 64 and thus reduce the opening angle, as compared to the opening angle of the second light sources 64. Again, the second light sources 64 are LEDs in the exemplary embodiment of FIG. 2.

The support brackets 24 are shown to have angled portions for supporting the first light sources 44 and the second light sources 64. This is an efficient mechanical way of directing the light output of the first light sources 44 and second light sources 64 in the general directions of the wing illumination reference direction 40 and the airfield illumination reference direction 60, respectively. However, it is also possible that such orientation of the light outputs may be achieved via optical elements.

The combined aircraft wing scan and runway turn-off light unit 2 further comprises a control and power supply module 30. The control and power supply module 30 has a switching circuit 32 and a power supply 34. Further, the control and power supply module 30 is coupled to a control input 50, to a power input 52, and to an electrical ground 54. The power supply 34 conditions the power received from the power input 52 for being supplied to the first light sources 44 as well as to the second light sources 64. The switching circuit receives control data from the control input 50 and establishes an electrical connection between the power supply 34 on the one hand and the first light sources 44 and/or the second light sources 64 on the other hand, depending on the control data received. In this way, both lighting functionalities are implemented with a single power supply 34 only.

In the exemplary embodiment of FIG. 2, the switching circuit is configured to only provide power to either the first light sources 44 or the second light sources 64, or to none of the light sources. In this way, the power supply 34 can be designed for comparably low power requirements, because it does not have to provide power to all light sources at the same point in time. It is pointed out that such a design of the control and power supply module 30 is exemplary only and that any other suitable design is possible as well. Further, the power and control input may be designed differently. For example the combined aircraft wing scan and runway turn-off light unit 2 may be connected to an electrical ground and to two power inputs. In that case, a non-zero power input on each of the two power inputs may indicate a desired turning on of the first light sources and the second light sources, respectively. In that case, no switching takes place within the combined aircraft wing scan and runway turn-off light unit 2, but the switching is implemented outside of the sphere of the combined aircraft wing scan and runway turn-off light unit 2.

For completeness, the flight direction 130 is indicated via an according arrow in FIG. 2.

Figure 3:
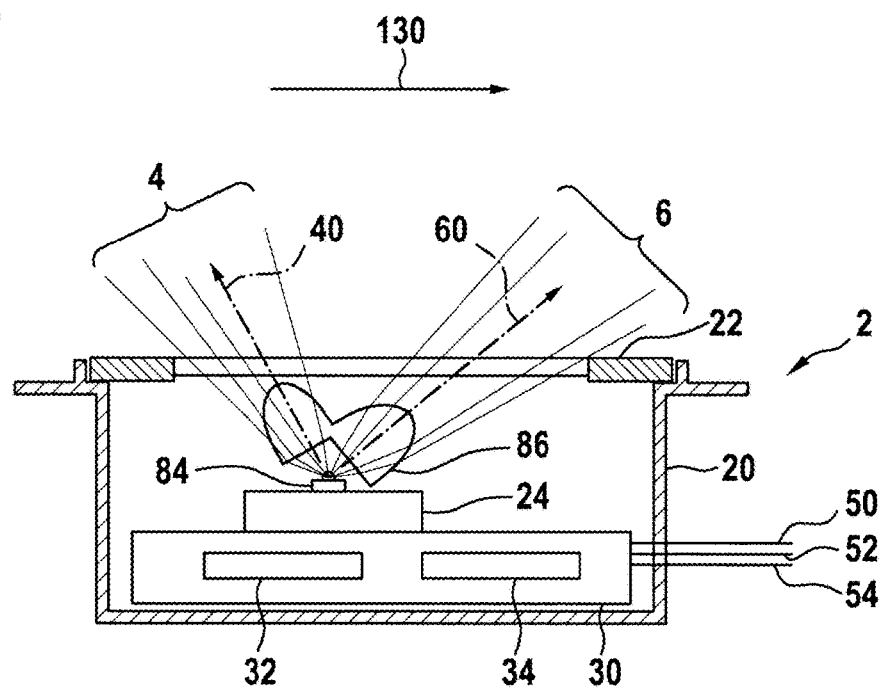
FIG. 3 shows a combined aircraft wing scan and runway turn-off light unit in accordance with another exemplary embodiment of the invention.

FIG. 3 shows a combined aircraft wing scan and runway turn-off light unit 2 in accordance with another exemplary embodiment of the invention in a schematic horizontal cross-sectional view. Many components are similar or identical to the combined aircraft wing scan and runway turn-off light unit 2 of FIG. 2. These components will not be described in detail again, and reference is made to above description of FIG. 2.

The combined aircraft wing scan and runway turn-off light unit 2 of FIG. 3 has one support 24, one light source 84, which is also an LED, and one optical system 86, which is a lens in the exemplary embodiment of FIG. 3. The lens 86 splits the light, as emitted by the single light source 84, into two different light outputs, one of them surrounding the wing illumination reference direction 40 and the other one of them surrounding the airfield illumination reference direction 60. For each of the two light outputs, multiple exemplary light rays are depicted, with the entirety of the respective light rays illustrating the first illumination region 4 and the second illumination region 6.

The lens 86 is comprised of two collimating lens portions, with each of the collimating lens portions affecting about half of the light output of the single light source 84. The two collimating lens portions are shaped to provide the first illumination region 4 and the second illumination region 6 with light of a desired general direction and a desired opening angle. It is apparent to the skilled person that the concrete shape of the lens 86 may be adapted to the particular application and design of the combined aircraft wing scan and runway turn-off light unit 2. Also, instead of a single lens 86, multiple optical elements, including one or more lenses and/or one or more reflectors may be employed.

As the combined aircraft wing scan and runway turn-off light unit 2 of FIG. 3 has only one light source 84 and only one optical element 86, an implementation with particularly low complexity may be achieved. However, in this case, the two lighting functionalities may only be switched on/off together.

Figure 4:
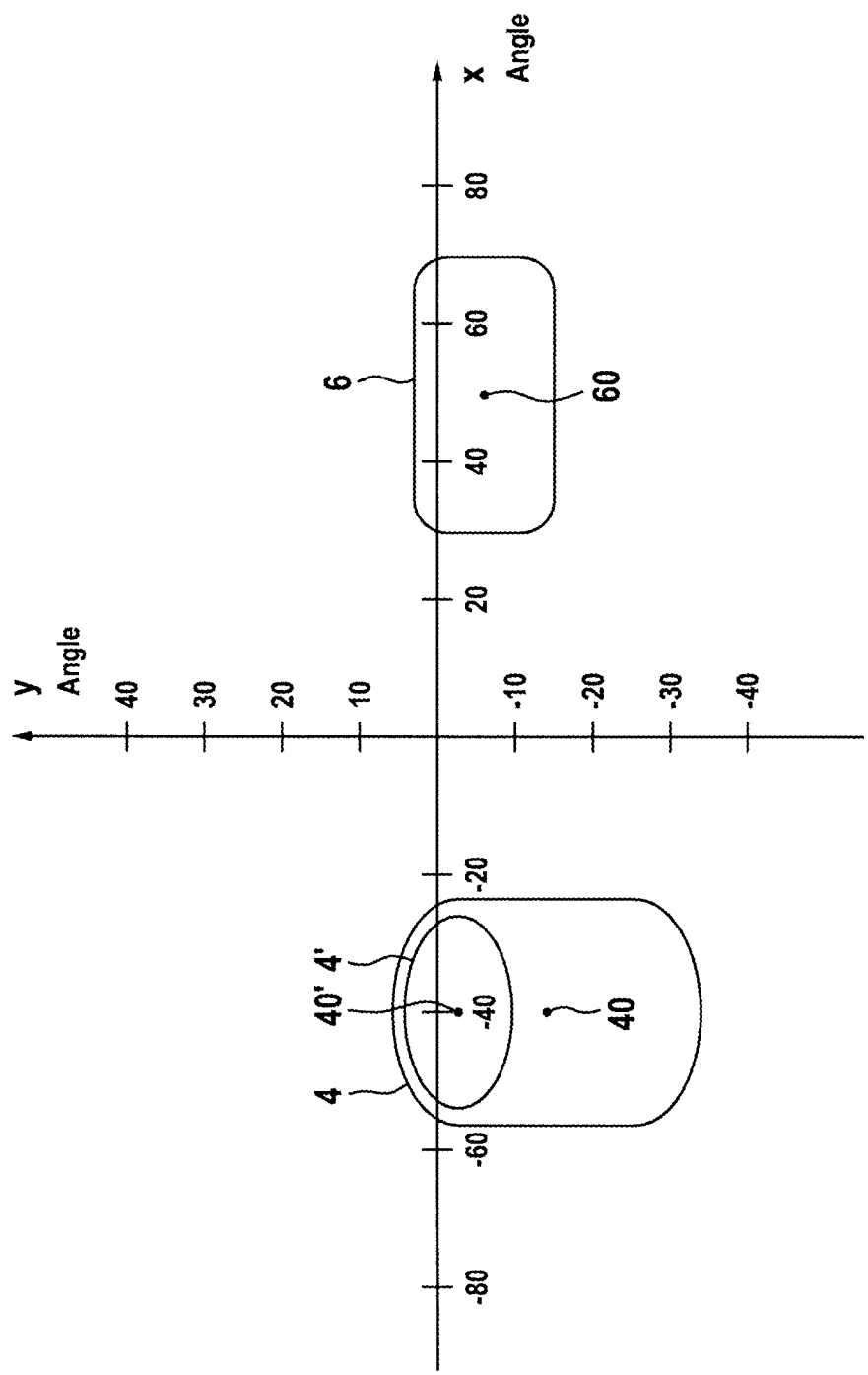
FIG. 4 shows a light emission distribution of a combined aircraft wing scan and runway turn-off light unit in accordance with an exemplary embodiment of the invention.

FIG. 4 shows an exemplary light emission distribution of a combined aircraft wing scan and runway turn-off light unit in accordance with an exemplary embodiment of the invention. The light emission distribution is shown with respect to a coordinate system having a horizontal angle on the x-axis and a vertical angle on the y-axis. The angle 0°/0° is a lateral straight out direction, as seen from the combined aircraft wing scan and runway turn-off light unit, i.e. a direction orthogonal to the longitudinal axis of the aircraft, when projected onto a common horizontal plane.

The first illumination region 4 has a wing illumination reference direction 40 with a lateral angle of −40° and a vertical angle of −15° with respect to the straight out direction. The first illumination region 4 has a vertical opening angle of about 40° and a horizontal opening angle of about 30°. In this way, both the front edge of the wing as well as the front edge of the engine, which may be arranged below the wing, can be inspected effectively. For comparison, an adapted first illumination region 4' is shown, which has a smaller vertical opening angle and a similar horizontal opening angle. Such an adapted first illumination region 4' is useful for application scenarios where the focus is on the inspection of the front edge of the wing only.

It is pointed out that the shown angular ranges of the first illumination region 4 and the adapted first illumination region 4' are exemplary only and may be adapted to the particular application scenario for the combined aircraft wing scan and runway turn-off light unit, e.g. to the particular arrangement and positioning of wing, engine(s) and light unit. For example, the first illumination region may extend to the horizontal angle of −20° or to horizontal angles even closer to the lateral straight out direction.

The second illumination region 6 has an airfield illumination reference direction 60 that has a lateral angle of 50° and vertical angle of about −8° with respect to the straight out direction. The second illumination region 6 has a horizontal opening angle of about 40° and a vertical opening angle of about 20°.

It is pointed out that the given reference directions and opening angels are exemplary in nature and are provided for illustrative purposes. In particular, the depicted first and second illumination regions illustrate that the combined aircraft wing scan and runway turn-off light unit fulfils two lighting functionalities in totally indifferent angular regions and has different output characteristics for the two light outputs. The opening angles are respectively defined as those regions where the emitted light intensity is above 10% of the peak light intensity of the respective illumination region.

The invention claimed is:

1. Combined aircraft wing scan and runway turn-off light unit, comprising:
    a housing for mounting the combined aircraft wing scan and runway turn-off light unit to a side portion of a fuselage of an aircraft,
    at least one light source, and
    an optical system for shaping a light emission distribution of the combined aircraft wing scan and runway turn-off light unit,
    wherein the light emission distribution comprises a first illumination region for illuminating a wing region of the aircraft and a second illumination region for illuminating a lateral forward airfield region,
    wherein the at least one light source comprises a plurality of light sources having at least one first light source and at least one second light source, wherein the optical system comprises at least one first optical system for directing the light from the at least one first light source to the first illumination region and at least one second optical system for directing the light from the at least one second light source to the second illumination region, and wherein the at least one first light source, the at least one second light source, the at least one first optical system, and the at least one second optical system are stationary within the combined aircraft wing scan and runway turn-off light unit.

2. A combined aircraft wing scan and runway turn-off light unit according to claim 1, wherein the first illumination region has a wing illumination reference direction and provides for wing illumination with a horizontal opening angle of between 10° and 30° around the wing illumination reference direction.

3. A combined aircraft wing scan and runway turn-off light unit according to claim 2, wherein the wing illumination reference direction has a lateral angle of between 35° and 55°, with respect to a rearward longitudinal direction of the aircraft.

4. A combined aircraft wing scan and runway turn-off light unit according claim 1, wherein the second illumination region has an airfield illumination reference direction and provides for airfield illumination with a horizontal opening angle of between 20° and 70°, around the airfield illumination reference direction.

5. A combined aircraft wing scan and runway turn-off light unit according to claim 4, wherein the airfield illumination reference direction has a lateral angle of between 35° and 55°, with respect to a forward longitudinal direction of the aircraft.

6. A combined aircraft wing scan and runway turn-off light unit according claim 1, wherein, between the first illumination region and the second illumination region, the light intensity distribution has a light intensity of less than 10% of a peak light intensity in the second illumination region.

7. A combined aircraft wing scan and runway turn-off light unit according to claim 1, wherein the at least one light source comprises at least one LED.

8. A combined aircraft wing scan and runway turn-off light unit according to claim 1, further comprising a single power supply, with the at least one first light source and the at least one second light source sharing the single power supply.

9. A combined aircraft wing scan and runway turn-off light unit according to claim 1, further comprising a switching circuit, with the switching circuit providing power to either the at least one first light source or to the at least one second light source.

10. A combined aircraft wing scan and runway turn-off light unit, comprising:
a housing for mounting the combined aircraft wing scan and runway turn-off light unit to a side portion of a fuselage of an aircraft;
at least one light source; and
an optical system for shaping a light emission distribution of the combined aircraft wing scan and runway turn-off light unit,
wherein the light emission distribution comprises a first illumination region for illuminating a wing region of the aircraft and a second illumination region for illuminating a lateral forward airfield region,
wherein the at least one light source is exactly one light source and wherein the optical system further comprises a lens for splitting light from the exactly one light source between the first illumination region and the second illumination region,
wherein the exactly one light source and the lens are stationary within the combined aircraft wing scan and runway turn-off light unit.

11. An aircraft comprising:
an aircraft fuselage, extending from a nose to a tail of the aircraft,
a left wing, having a left wing root, and a right wing, having a right wing root, and
at least one combined aircraft wing scan and runway turn-off light unit that includes:
a housing for mounting the combined aircraft wing scan and runway turn-off light unit to a side portion of a fuselage of an aircraft,
at least one light source, and
an optical system for shaping a light emission distribution of the combined aircraft wing scan and runway turn-off light unit,
wherein the light emission distribution comprises a first illumination region for illuminating a wing region of the aircraft and a second illumination region for illuminating a lateral forward airfield region,
wherein the at least one light source comprises a plurality of light sources having at least one first light source and at least one second light source,
wherein the optical system comprises at least one first optical system for directing the light from the at least one first light source to the first illumination region and at least one second optical system for directing the light from the at least one second light source to the second illumination region, and
wherein the at least one first light source, the at least one second light source, the at least one first optical system, and the at least one second optical system are stationary within the combined aircraft wing scan and runway turn-off light unit,
wherein the at least one combined aircraft wing scan and runway turn-off light unit is mounted to at least one of a left side portion and a right side portion of the aircraft fuselage.

12. An aircraft according to claim 11, wherein the at least one combined aircraft wing scan and runway turn-off light unit is positioned between 30% and 70% of the distance between the nose and a respective one of the left wing root and the right wing root.

13. An aircraft according to claim 12, wherein the at least one combined aircraft wing scan and runway turn-off light unit is positioned between 40% and 60% of the distance between the nose and the respective one of the left wing root and the right wing root.

* * * * *